(12) United States Patent
Kurosawa

(10) Patent No.: US 6,982,816 B2
(45) Date of Patent: Jan. 3, 2006

(54) FILM SCANNER

(75) Inventor: Yuichi Kurosawa, Tokyo (JP)

(73) Assignee: PENTAX Corporation, Tokyo (JP)

( * ) Notice: Subject to any disclaimer, the term of this patent is extended or adjusted under 35 U.S.C. 154(b) by 1000 days.

(21) Appl. No.: 09/773,585

(22) Filed: Feb. 2, 2001

(65) Prior Publication Data

US 2001/0012136 A1   Aug. 9, 2001

(30) Foreign Application Priority Data

Feb. 3, 2000 (JP) ............................ P2000-026342

(51) Int. Cl.
 *H04N 1/04* (2006.01)
(52) U.S. Cl. ...................... 358/487; 358/488; 358/527; 358/506; 348/96; 348/347; 355/40; 355/75; 396/387; 396/395
(58) Field of Classification Search ................ 358/487, 358/505, 506, 527, 486, 488, 496, 1.9, 409, 358/453, 411, 420; 348/96, 347; 355/75, 355/40; 396/387, 395

See application file for complete search history.

(56) References Cited

U.S. PATENT DOCUMENTS

| | | | | |
|---|---|---|---|---|
| 3,749,827 A | * | 7/1973 | Kinjo et al. ............... 360/267 |
| 4,800,546 A | * | 1/1989 | Shikichi et al. .......... 369/44.28 |
| 5,008,607 A | * | 4/1991 | Ono et al. ................. 318/696 |
| 5,162,842 A | * | 11/1992 | Shiota ........................ 355/40 |
| 5,995,204 A | * | 11/1999 | Hoshino et al. ............. 355/75 |
| 6,101,006 A | * | 8/2000 | Bryant et al. ............... 358/506 |
| 6,195,182 B1 | * | 2/2001 | Kunishige ................... 358/487 |
| 6,211,975 B1 | * | 4/2001 | Bryant ....................... 358/527 |
| 6,215,575 B1 | * | 4/2001 | Tuchman .................... 359/230 |
| 6,577,343 B2 | * | 6/2003 | Ohkawara ................... 348/347 |

OTHER PUBLICATIONS

U.S. Appl. No. 09/472,243, Y. Kurosawa et al., filed on Dec. 27, 1999.
U.S. Appl. No. 09/773,584, Y. Kurosawa, filed on Feb. 2, 2001..

* cited by examiner

*Primary Examiner*—Kimberly Williams
*Assistant Examiner*—Negussie Worku
(74) *Attorney, Agent, or Firm*—Greenblum & Bernstein, P.L.C.

(57) ABSTRACT

A film scanner has a transport table for transporting the film held by a film holder in a sub-scan direction, a transport mechanism for moving the transport table in the sub-scan direction, a line sensor and a line sensor drive circuit for obtaining an image of the film. The transport mechanism is provided with a scan motor driven in predetermined steps. The line sensor and the line sensor drive circuit are configured to read the signal at a first timing corresponding to a rotational position of the step of the scan motor and read the signal at both of the first timing and a second timing where the motor temporarily stops, due to overshoot, at an angular position between first timings.

9 Claims, 8 Drawing Sheets

FILM SCANNER

BACKGROUND OF THE INVENTION

1. Field of the Invention

The present invention relates to a film scanner for scanning an image formed on a silver halide film by a photoelectric conversion element to convert it to an image signal.

2. Description of the Related Art

Recently, along with the development of personal computers (PC), it is known that an image taken by a digital still camera and an image scanned by a scanner are input into a PC for image processing or storage. Similarly, an image, recorded on a photographic film such as silver halide film, can be scanned by the scanner and input into the PC. In the scanner, a line sensor comprised of an array of photoelectric conversion elements is moved in a sub-scan direction perpendicular to the longitudinal direction of the line sensor.

In this type of film scanner, it is desired to scan the film image at different resolutions. For example, when dense image data is desired, the image is scanned at a high resolution, while when the PC has a small storage capacity, the image is scanned at a low resolution. Alternatively, there are scanners provided with pre-scan functions of scanning a film image at a low resolution for confirmation before the main-scan of the film image at the regular resolution. In such a case, normally, the pitch by which the film is transported for scanning the film image at different positions is changed. For the high resolution main-scan, the pitch of the film transport is made fine, while for the low resolution pre-scan, the pitch of film transport is made coarse. Therefore, conventionally, provision has been made for a stepper motor serving as the source of drive power for the transport mechanism which moves the transport table and a variable speed reduction mechanism to switch the rotational output of the stepper motor. A predetermined pulse is supplied per unit time to the stepper motor to drive the rotation of the stepper motor in predetermined steps. In the main-scan and the pre-scan, the speed ratio of the speed changer is switched to change the pitch of movement of the transport table.

In a film transport mechanism of such a configuration, however, a gear mechanism comprised of a plurality of gears is required for constructing the variable speed reduction mechanism used as the speed changer. Further, a mechanism is necessary for switching the states of engagement of the plurality of gears to change the speed ratio. Thus, the film transport mechanism becomes complicated. This becomes an obstacle in reducing the size and cost of the film scanner. Further, it may be considered to set the scanning pitch of the film transport mechanism at the minimum pitch and switch the number of pulses for driving the stepper motor so as to change the pitch of movement of the transport table between the main-scan and the pre-scan, but the number of pulses supplied to the stepper motor itself would be the same between the pre-scan and the main-scan, so the pre-scan would then take the same amount of time as the main-scan despite the coarser scan.

SUMMARY OF THE INVENTION

Therefore, an object of the present invention is to provide a film scanner which achieves simplification of the structure and enables scanning at a higher resolution than the resolution of the steps of the stepper motor.

According to the present invention, there is provided a film scanner for reading an image formed on a film, the film scanner comprising an imaging device, a transport table, a stepper motor and a image signal reading processor. The imaging device senses part of the image to generate an image signal. The transport table supports the film. The stepper motor moves the transport table in a predetermined direction, so that the imaging device can sense the whole image, the stepper motor being driven in steps. The image signal reading processor reads the image signal in synchronization with movement of the transport table. The image signal reading processor reads at one or both of a first timing where the stepper motor stops at a rotational angle position of a step and a second timing where the stepper motor temporarily stops at least at one rotational angle position in the middle of a step.

Further, according to the present invention, there is provided a film scanner provided with an imaging device for performing a main-scan of a film on which an image is formed to scan the image and a scanning mechanism for moving the film in a sub-scan direction perpendicular to the main-scan direction with respect to the imaging device, characterized in that the scanning mechanism is provided with a transport table for supporting the film and transporting it in the sub-scan direction, a transport mechanism for making the transport table move in the sub-scan direction, and an image signal reading processor for reading an image signal of the film obtained by the imaging device in synchronization with movement of the transport table. The transport mechanism is provided with a stepper motor serving as a source of drive power and driven in required steps. The image signal reading processor is configured to read the image signal at one or both of a first timing where the stepper motor stops at a rotational angle position of a step and a second timing where it temporarily stops at least at one rotational angle position in the middle of a step.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
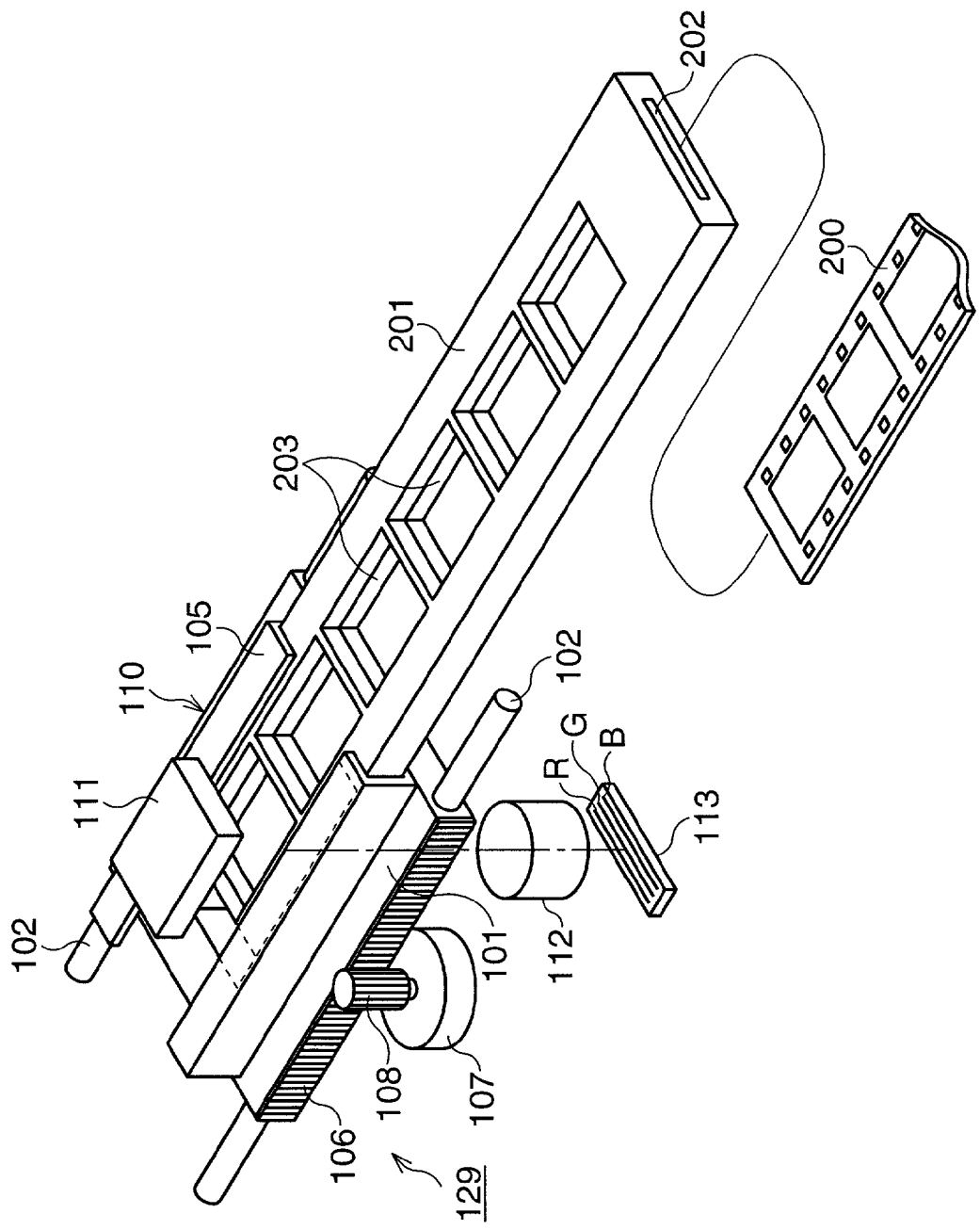
FIG. 1 is a perspective view of the overall configuration of an embodiment of a film scanner of the present invention.

The present invention will be described below with reference to an embodiment shown in the drawings.

Figure 2:
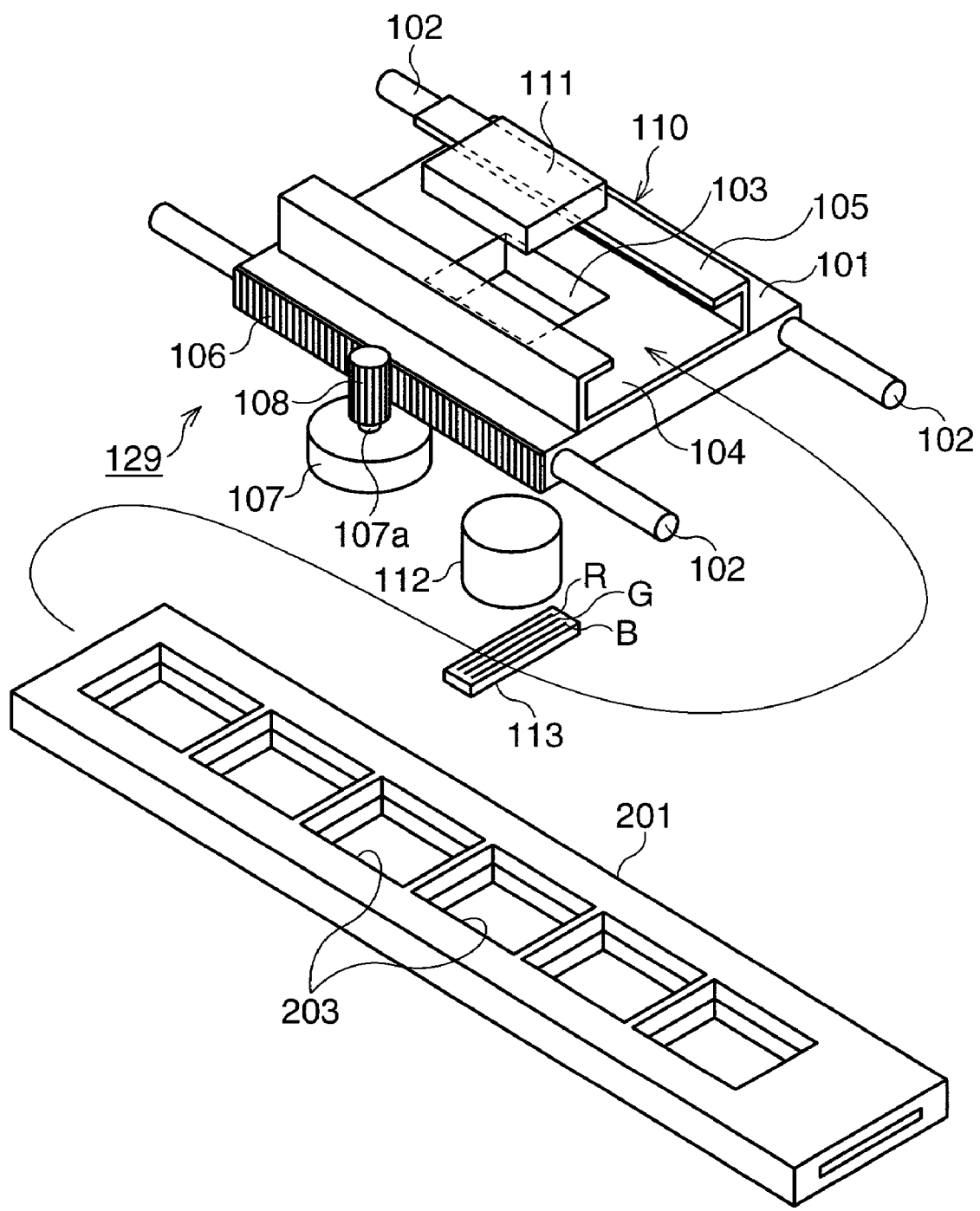
FIG. 2 is a partial disassembled perspective view of FIG. 1.

FIG. 1 is a perspective view of the general configuration of a film scanner of the embodiment of the present invention, while FIG. 2 is a partial disassembled perspective view of the same. Two guide bars 102 are provided in a not shown housing in the horizontal direction. A transport table 101 is carried by the guide bars 102. A film holder 201 for holding a film to be scanned is held on the transport table 101. A scan unit 110 is formed at part of the region in the longitudinal direction between the two guide bars 102. The scan unit 110 is comprised of a diffused illumination source 111 arranged at a position above the guide bars 102 and with a light emitting surface facing down, an imaging lens 112 arranged directly under the diffused illumination source 111 at a position below the guide bars 102, and a line sensor 113 comprised of an array of CCDs for photoelectric conversion of the image formed by the imaging lens 112. The line sensor 113 is comprised of three parallel line sensors corresponding to the RGB colors. The line direction of the line sensor 113 is perpendicular to the longitudinal direction of the guide bars 102. By scanning in the line direction, the main-scan of the film is performed simultaneously for the RGB colors.

The guide bars 102 pass through two sides of the transport table 101 so that the transport table 101 can slidably and reciprocally move along the guidebars 102. A rectangular scanning window 103 is formed in the direction of thickness at the substantial center position of the transport table 101. The film is scanned by the line sensor 113 through this scanning window 103. On the top surface of the transport table 101, a film holder rail member 104 is affixed in the longitudinal direction, with two sides bent into L-shaped rails 105 along the two longitudinal sides of the scanning window 103. The film holder 201 is held between the rails 105. The film holder 201 is able to move along the direction of extension of the rails 105. A rack 106 is provided integrally along the longitudinal direction at one side face of the transport table 101. A pinion 108 attached to a shaft 107a of a stepper motor 107 fixed to the housing near one guide bar 102 is engaged with the rack 106. The rack 106 and the pinion 108 constitute the transport mechanism 129. The scan motor 107 is a stepper motor driven by a pulse signal as will be explained later.

The film 200 held by the film holder 201 is comprised of a film strip obtained by dividing a 35 mm film into lengths of, for example, six frames. The film holder 201 holding this film 200 is formed into a strip shape of dimensions somewhat larger than the film 200. At the substantial center in the thickness direction, a slot 202 for inserting the film 200 is formed over the entire length in the longitudinal direction. Six frame windows 203 are arranged in the longitudinal direction of the film holder 201 corresponding to the slot 202 and open in the thickness direction of the frame holder 201. The frame windows 203 are formed to sizes and pitches corresponding to the frames of the images formed on the film 200.

Figure 3:
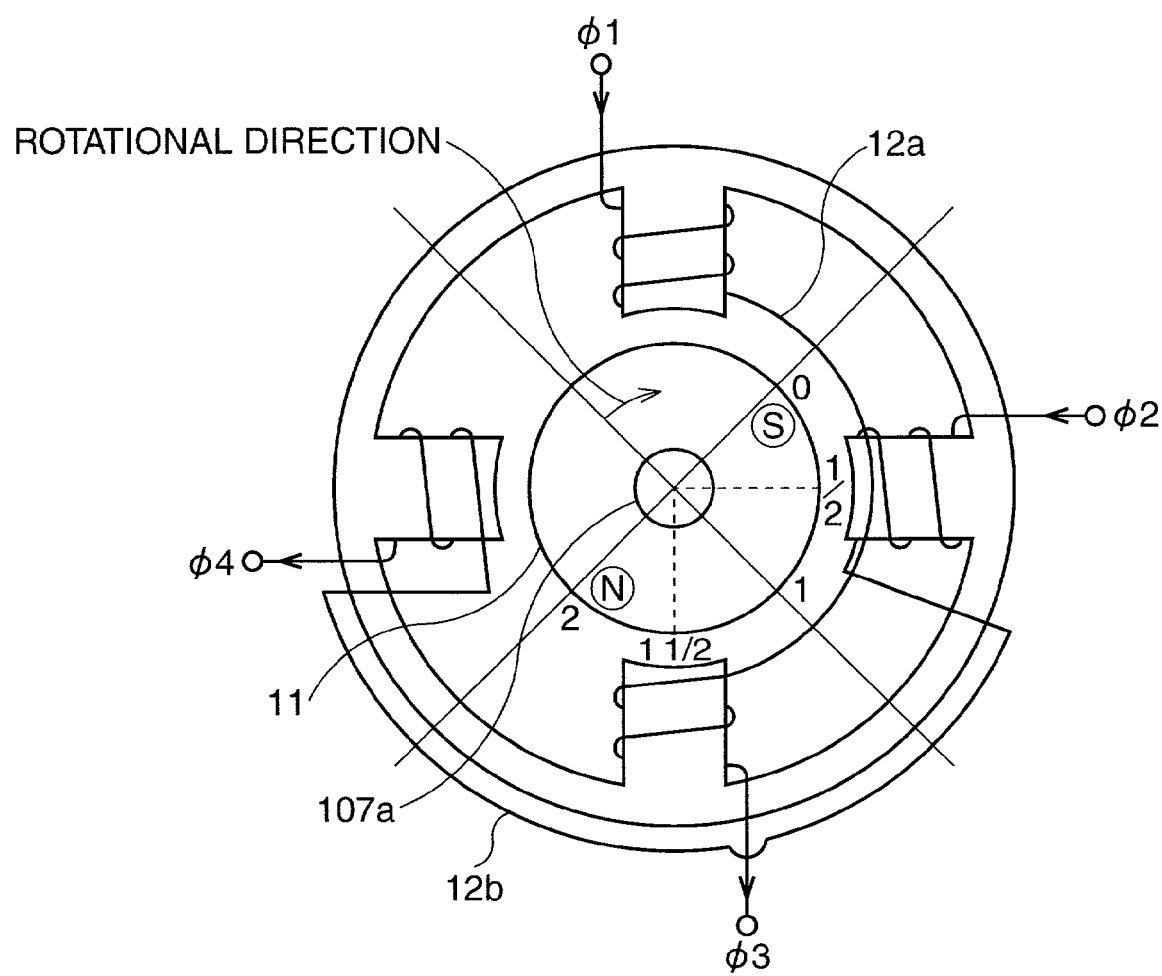
FIG. 3 is a schematic view for explaining the configuration and operation of a scan motor (stepper motor)

FIG. 3 is a view of the general configuration of the scan motor 107. Here, for simplification, the basic step angle is made 90 degrees. The motor 107 is provided with a rotor 11 with N and S poles arranged alternately in the circumferential direction and formed integrally with the shaft 107 and phase coils 12a and 12b serving as a stator arranged in the circumferential direction around the rotor 11 and fixed to a not shown motor case. Note that here, to facilitate understanding, the rotor 11 is provided with a pair of an S pole and N pole facing each other in the diametrical direction. The phase coils 12a and 12b serve as the stator, and the first phase coil 12a is arranged at angular positions of 180 degrees in the circumferential direction and the second phase coil 12b is arranged at angular positions of 90 degrees in the circumferential direction with respect to the first phase coil 12a. The first phase coil 12a has one end designated as a first phase terminal φ1 and the other end as the third phase terminal φ3, while the second phase coil 12b has one end designated as the second phase terminal φ2 and the other end as the fourth phase terminal φ4.

Figure 4:
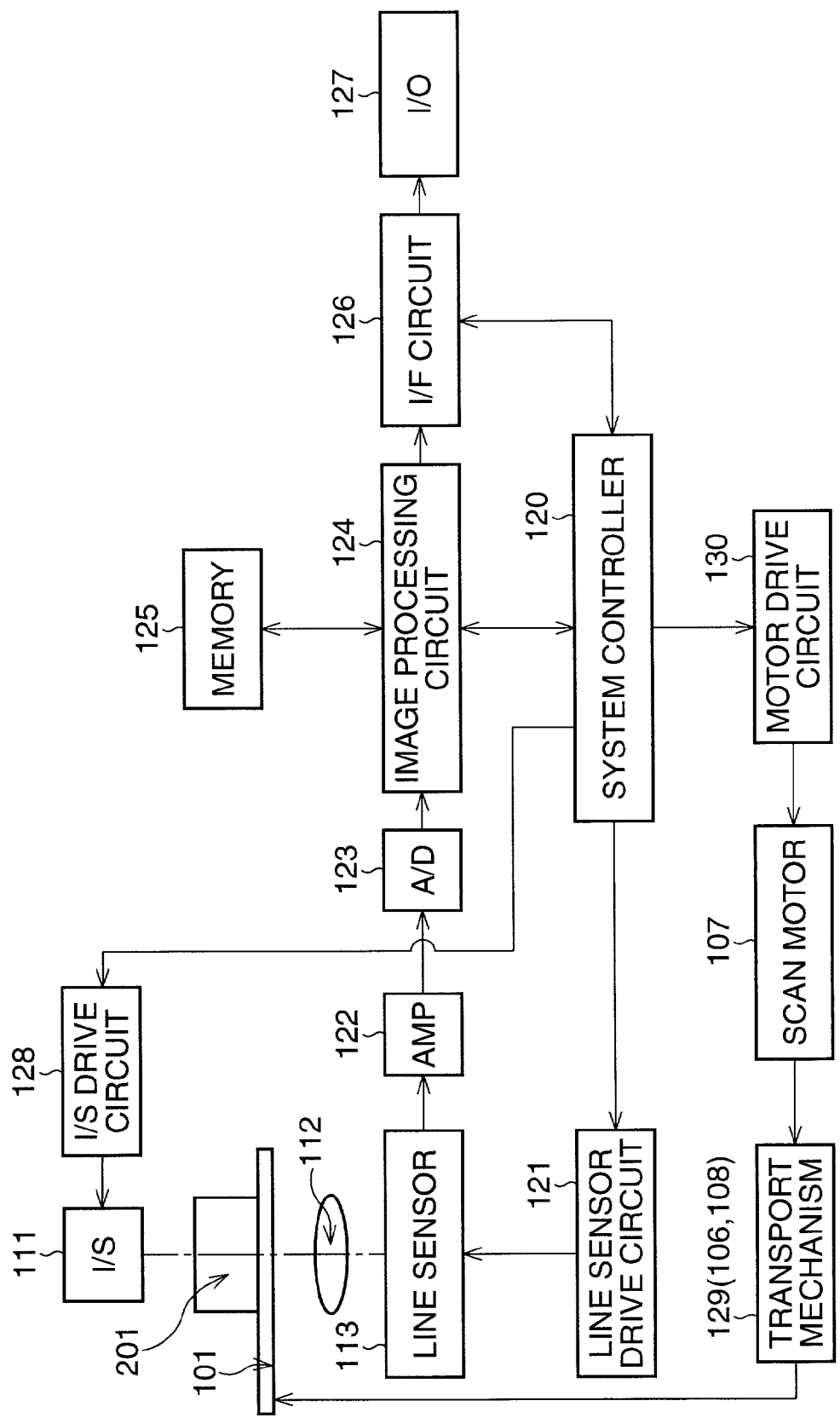
FIG. 4 is a block diagram of the electrical circuit of the film scanner.

FIG. 4 shows the configuration of the electrical circuit of the film scanner. Note that the portions shown in FIG. 1 and FIG. 2 are given the same reference numerals. The line sensor 113 is driven by a line sensor drive circuit 121 controlled by a system controller 120. The signal obtained by the line sensor 113 is output at a predetermined timings as a scan signal. The scan signal of the film output from the line sensor 113 is amplified by an amplifier 122, converted to a digital signal at an A/D converter 123, and subjected to a predetermined image processing at an image processing circuit 124, to produce the processed image signal. A memory 125 stores the processed image signal. The image signal is output through an interface circuit 126 to an input/output terminal 127 and sent to a not shown PC etc. Light emission from the diffused illumination source 111 is controlled by an illumination source drive circuit 128, which in turn is controlled by the system controller 120. Rotation of the scan motor 130 is controlled by a motor drive circuit 130, which in turn is controlled by the system controller 120, and is configured to drive the transport mechanism 129 comprised of the rack 106 and pinion 108.

Figure 5:
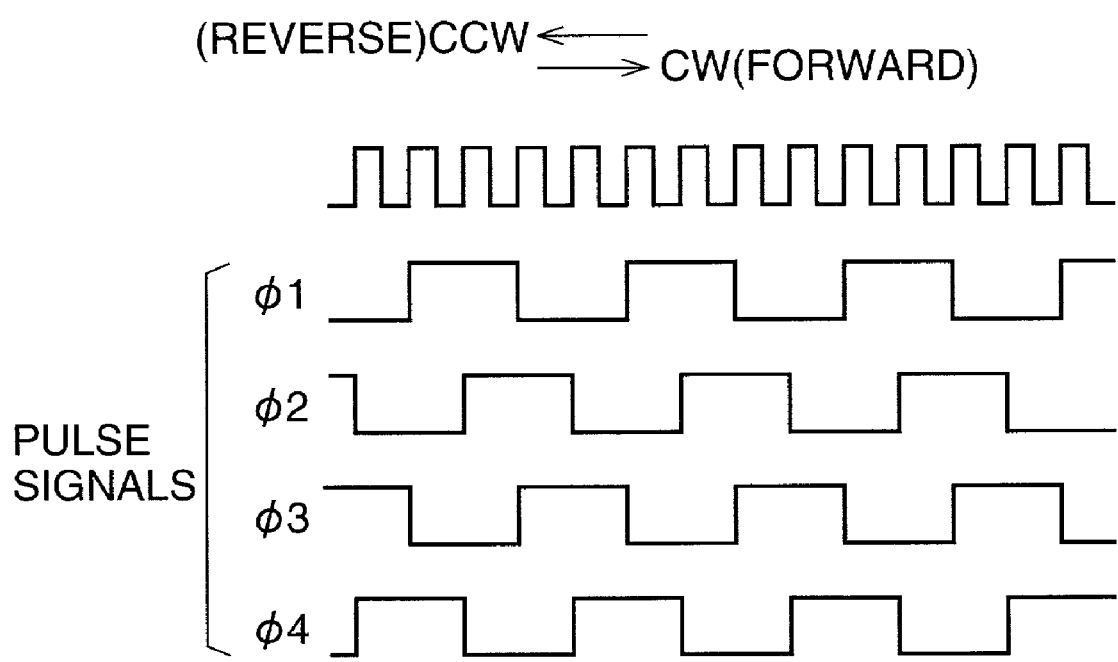
FIG. 5 is a timing chart of the pulse signals of a 2-2 phase excitation mode input to the scan motor (stepper motor)

The operation of driving the scan motor 107 by the drive circuit 130 will be explained. Referring to FIG. 3, in the scan motor 107, the rotational angle position of the rotor 11 is set by a step which corresponds to the magnetic force produced between the field caused by the phase coils 12a and 12b and the field caused by the N pole and S pole of the rotor 11 due to the control of the phases of the pulse signals supplied to the first phase terminal φ1 to the fourth phase terminal φ4. Namely, a pulse signal of the 2—2 phase excitation mode is supplied from the motor drive circuit 130 to the scan motor 107, as shown in FIG. 5. Due to this, in the scan motor 107, the polarity of the stators comprised by the first and second phase coils 12a and 12b successively changes between the S pole and the N pole along the circumferential direction, so due to the balance of the magnetic attraction and repulsion caused at the S poles and N poles of the stators and the S pole and N pole of the rotor 11, the rotor 11 is driven by full-steps comprised by the basic rotational angle determined by the pitch of arrangement of the stators in the circumferential direction, that is, the 90 degree angle of the pitch of arrangement of the stators in the example of FIG. 3, and at rotational step positions comprised of the intermediate angular (45 degree) positions between adjoining stators. FIG. 3 shows the rotational step positions by "0", "1", and "2". Further, the pinion 108 is rotated corresponding to the 90 degree rotational angle of this full-step, so the transport table 101 is moved by a pitch corresponding to the full-step.

In the rotation operation of the scan motor 107, as described above, pulse signals are supplied to the first and second phase coils 12a and 12b of the scan motor 107 and the rotational angle position of the rotor 11 is determined by the balance of magnetic attraction and repulsion at the first and second phase coils 12a and 12b. At this time, however, the rotor excessively rotates in the rotation direction before the balance is reached, that is, overshoots. This overshoot, as seen from the characteristic of rotational angle with respect to the time axis in FIG. 6, has the characteristic of a vibration system where the rotor 11 overshoots by a large extent right after starting to turn, then is gradually constrained while alternately undershooting and overshooting, and then stabilizes at the targeted rotational angle position.

Figure 6:
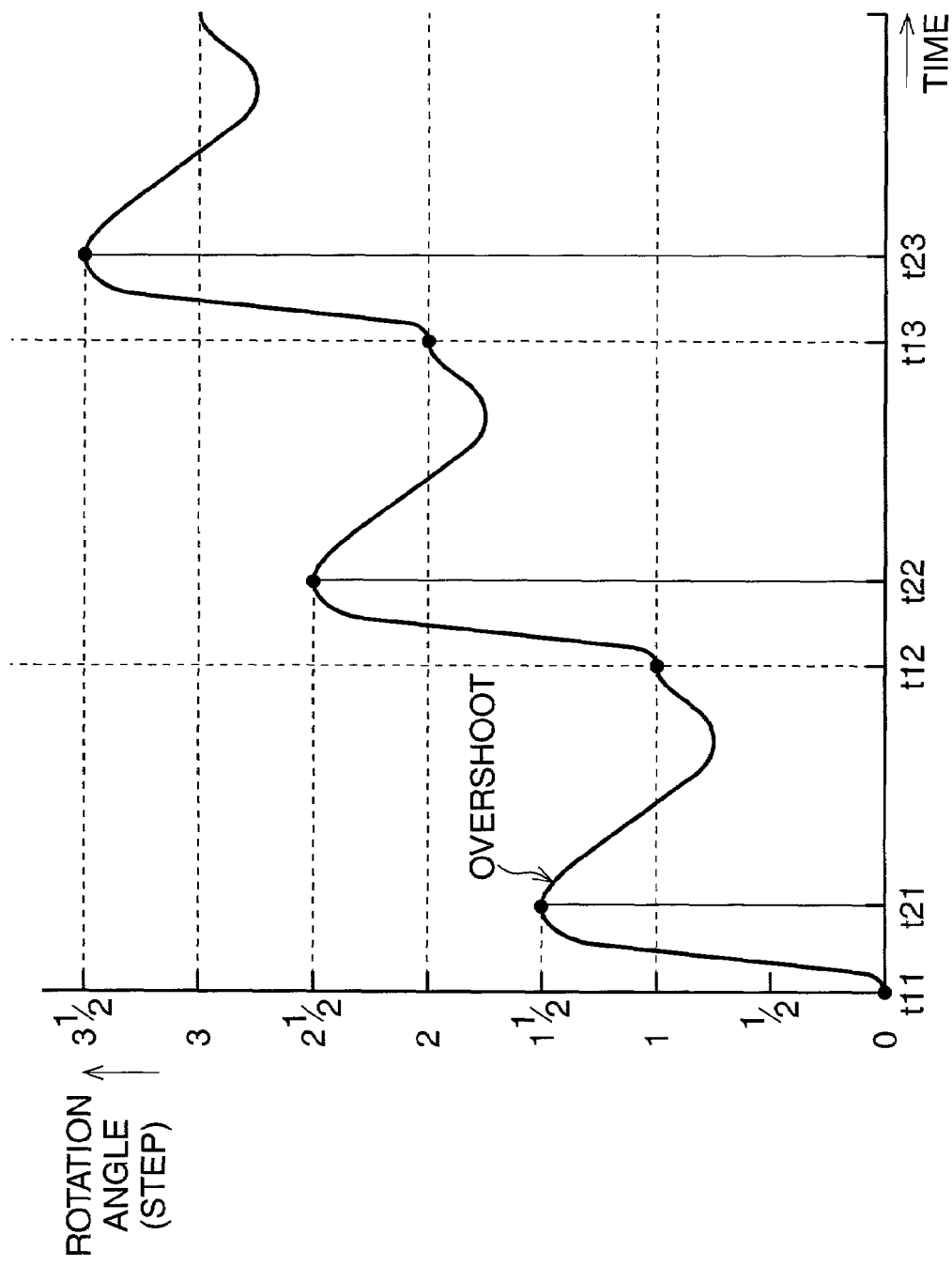
FIG. 6 is a view of the characteristics of overshoot occurring in a scan motor (stepper motor)

Note that in FIG. 6, the drive pulse rate is set in such a manner that only a single vibration occurs. The single vibration operation is obtained as follows: Namely, an experiment is performed until a stable result is confirmed, and a vibration period suitable for the single vibration operation is obtained. Then, in the single vibration operation, a pulse for the next step is output before starting the next vibration period.

The initial amount of overshoot is correlated with the magnitude of the voltage of the pulse signal supplied to the first and second phase coils 12a and 12b. Therefore, by suitably setting the voltage of the pulse signal, it becomes possible to make the initial amount of overshoot one resulting in an angular position of half of the full-step. In other words, by setting the pulse signal in this way, as shown in FIG. 3, when the rotor 11 is driven by a full-step from a certain rotational angle position "0" to the next rotational angle position "1", it overshoots to a rotational angle position "1½" between the next rotational angle position "1" and the further next rotational angle position "2" further from that next rotational angle position, and temporarily stops for an instant at the rotational angle position "1½".

With reference to the flow chart of FIG. 7, scanning using the film scanner of the above configuration will be explained. First, the scan motor 107 is driven in a state with the film holder 201 not set on the transport table 101 so as to set the transport table to an initial position. At this time, the motor drive circuit 130 drives the scan motor 107 by full-steps in accordance with the 2—2 phase exciting mode shown in FIG. 5, whereby the transport table 101 is set to the initial position at a high speed (steps S101, S102, and S103). Further, in the initial position, it is confirmed that the film holder 201 is not set (step S104). If a film holder 201 is set, a holder removal warning is issued to warn the operator to remove the film holder (step S105). After it is confirmed that the holder is not set, the diffused illumination source is turned on (step S106) and light from the diffused illumination source is received by the line sensor 113 through the scanning window of the transport table 201. Shading is corrected at the image processing circuit 124 based on the received light (step S107).

Suitably thereafter, the operator inserts the film 200 to be scanned into the slot 202 of the film holder 201 and positions images of the film at the frame windows 203 of the film holder 201. Then, the operator inserts the film holder 201 between the rails 105 of the transport table 101 and positions an image to be scanned at the scanning window 103 of the transport table 101. After confirming that the film holder 201 is set (step S108), the diffused illumination source is turned on again and a charge period is determined based on the light received by the line sensor 113 through the film (step S109).

Figure 8A:
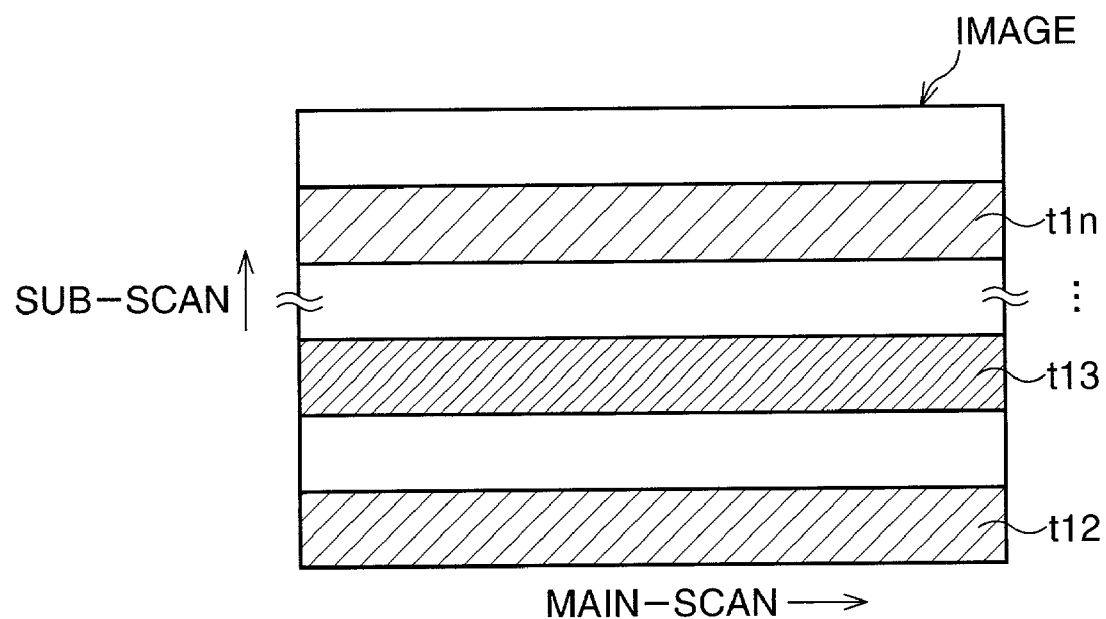
FIG. 8a is a schematic view showing a scanned image obtained in a pre-scan.

Then, it is determined whether a pre-scan is to be performed (step S110). When performing a pre-scan, the motor drive circuit 130 supplies pulse signals of the 2—2 phase excitation mode to the scan motor 107 in the same way as above. Due to this, the scan motor 107 is driven in full-steps and the transport table 101 and the film holder 201 are moved in the basic full-pitch units. The line sensor drive circuit 121 reads the image signal from the line sensor 113 at the positions where the transport table 101 has been moved in full-pitch units, in other words, as shown in FIG. 6, at the first timings t12, t13, . . . , t1n of the rotational angle positions to which the scan motor 107 is driven in full-steps, and sends it to the A/D converter 123 and image processing circuit 124. Due to this operation, a pre-scan is performed for coarsely scanning the frame image by the line sensor 113 as shown in FIG. 8a (step S111). In the present embodiment, the line sensor 113 scans the RGB colors, so the RGB colors are scanned by a single scan. When the pre-scan is completed, the scan motor 107 is driven in reverse in full-steps by the 2—2 phase excitation mode (step S112) to return the transport table 101 to the initial position (step S113). Conversely, when not performing the pre-scan, it is determined at step S114 whether the scan is to be ended. If it is to be ended, the program ends.

Figure 8B:
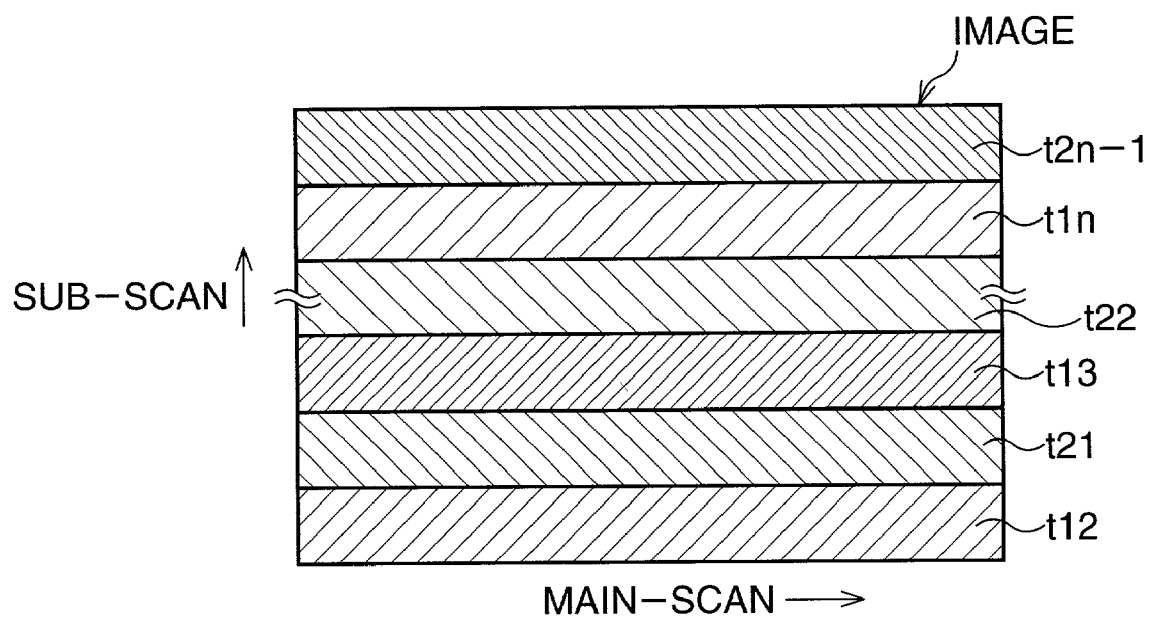
FIG. 8b is a schematic view showing a scanned image obtained in a main-scan.

When the pre-scan ends, it is determined whether a main-scan is to be performed (step S115). When not performing the main-scan, it is determined at step S114 whether the scan is to be ended. If it is to be ended, the program ends. When performing the main-scan, the main-scan corresponding to the set resolution is performed (step S116). At step S116 of the main-scan, the motor drive circuit 130, in the same way as the pre-scan, supplies pulse signals based on the 2—2 phase excitation mode shown in FIG. 5 to the scan motor 107. At the same time, the line sensor drive circuit 121 uses the overshoot caused at the scan motor 107 shown in FIG. 6 to read the image signal of the line sensor 113 at the first timings t12, t13, . . . t1n of the rotational angle positions, to which the scan motor is driven in full-steps and read the image signal of the line sensor 113 at the second timings t21, t22, . . . t2n–1 of the rotational angle positions at the centers of the full-steps due to the overshoot at times before the rotational angle positions of the full-steps. At this time, in the image signals read at the first and second timings, as shown in FIG. 8b, the read timings and the positions of the read image in the sub-scan direction become reversed. For example, the image read first at t21 comes after the image read immediately after at t12 in the sub-scan direction. Therefore, the image signals read at the first and second timings are sent to the A/D converter 123 and are rearranged in order in the image signal processing circuit 124 to obtain image signals of the correct order (step S116a).

Therefore, in the main-scan, the film is scanned using the image signal read at a rotational position of an inherent step of the scan motor 107 and the image signal read at a rotational position of a step advanced by exactly a half step from the rotational position of the inherent step at the point of time before the rotational position of the inherent step position. As a result, scanning in half steps becomes possible. Therefore, in the main-scan, the transport table 101 is moved by a half pitch compared with the pre-scan and the film is scanned at the positions of pitch movement, so a fine scan is performed at a resolution of two times that of the pre-scan. Note that, during the case of the main-scan, the RGB colors are simultaneously scanned by the line sensor 113.

Figure 7:
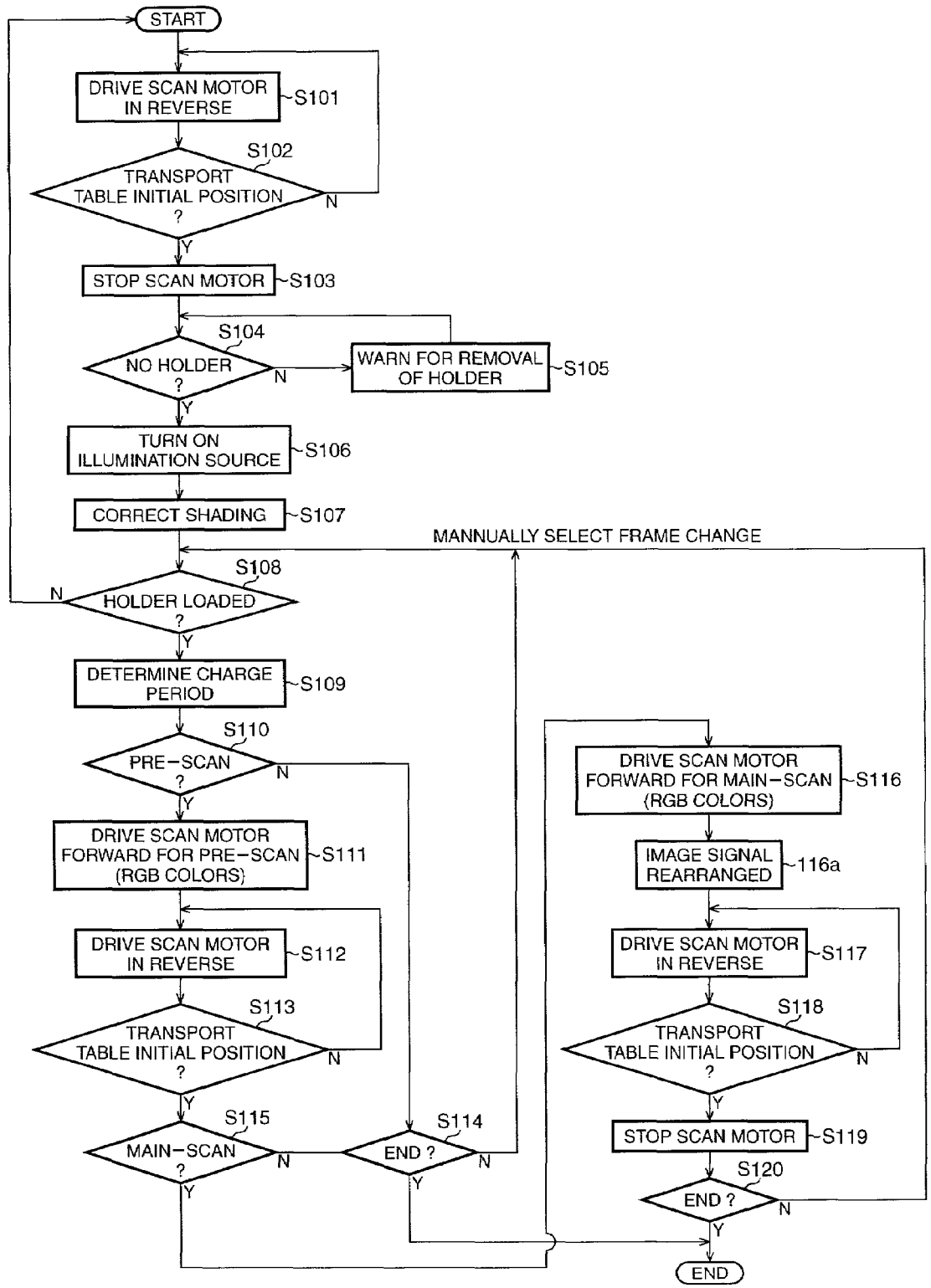
FIG. 7 is a flow chart of a program for carrying out a film scan operation.

When the scan by the main-scan is completed, in the flow chart of FIG. 7, the scan motor 107 is driven in reverse to return the transport table 101 to the initial position (steps S117 and S118), then the scan motor 107 is stopped (step S119). Then, it is determined whether the scan is to be ended (step S120) and if confirmed the program ends. Conversely, when not ending the scan at steps S114 and S120, the routine returns to step S108. On the other hand, when scanning another image of the film, the other frame image is positioned at the scanning gate of the transport table and the same process as above is performed. Further, when ending it, while a detailed explanation will be omitted, the scan is ended by removing the film holder 201 from the transport table 101.

In this way, in a main-scan where a high resolution is required, a fine scan is realized by reading the image signal of the line sensor at a second timing where the scan motor 107 overshoots. Conversely, in the case of a pre-scan etc. where a high resolution is not required, the scanmotor 107 is driven in the basic full-steps to move the transport table 101 at a large pitch for a sub-scan of the film, whereby a coarse scan is realized. Therefore, it is possible to realize scanning of film at different resolutions by a single motor and a single transport table scanning mechanism and thereby possible to simplify the structure of the scanning mechanism and reduce the size and cost of the film scanner. In this case, since the rotation operation itself of the scan motor 107, that is, the movement operation of the transport table 101, is the same at the time of a pre-scan and a main-scan, it becomes possible to end the main-scan in the same time as a pre-scan.

Note that the voltage supplied to the scan motor 107 so that the rotational angle position due to overshoot in the scan motor 107 becomes one of half steps may be found by measuring voltages supplied to the scan motor 107 and the states of rotation of the rotor 11 in advance. Further, when excessive overshoot occurs, it is also possible to read the image signal at timings that coincide with a plurality of rotational angle positions selected from a plurality of different rotational angle positions caused by several overshoots and thereby further improve the resolution in the main-scan.

Note that in this embodiment, the line sensor used was an RGB three-color three-line type, but it is also possible to use a 1-line type and treat the received signal as RGB color signals at an image processing circuit.

As described above, it becomes possible to scan by a step of a main-scan finer than the step of a pre-scan and with a high precision of scan position in the sub-scan direction, and thereby scan at different resolutions. It is also possible to simplify the configuration of the film scanner and reduce its size, and scan in steps smaller than the inherent step of the stepper motor and thereby realize a high resolution scan.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2000-026342 (filed on Feb. 3, 2000) which is expressly incorporated herein, by reference, in its entirety.

What is claimed is:

1. A film scanner for reading an image formed on a film, said film scanner comprising:
   an imaging device that senses a part of said image to generate an image signal;
   a transport table that supports said film;
   a stepper motor that moves said transport table in a predetermined direction, so that said imaging device can sense the whole of said image, said stepper motor being driven in steps; and
   an image signal reading processor that reads said image signal in synchronization with movement of said transport table, said image signal reading processor reading at one or both of a first timing where said stepper motor stops at a rotational angle position of a step and a second timing where said stepper motor stops at least at one rotational angle position within a step.

2. A film scanner according to claim 1, wherein said second timing is a stopping at a rotational angle position of half of a step.

3. A film scanner according to claim 1, wherein said image signal reading processor reads said image signal only at said first timing of said stepper motor at the time of a pre-scan of the film and reads said image signal at each of said first timing and said second timing at the time of a main-scan of the film.

4. A film scanner according to claim 1, wherein said stepper motor is stopped at a time of overshoot caused when said stepper motor is driven by said step and said second timing is the timing of the stopping due to said overshoot.

5. A film scanner according to claim 4, wherein the rotational angle position of the state of stopping of said stepper motor at the time of overshoot is a predetermined rotational angle position in the middle of said step.

6. A film scanner according to claim 1, wherein said transport table is detachably provided with a film holder for holding said film, a position of said film holder with respect to said transport table being changed to switch said image to be scanned.

7. A film scanner according to claim 1, further comprising a rack provided at said transport table along said predetermined direction, and a pinion attached to an output shaft of said stepper motor to engage with said rack.

8. A film scanner according to claim 1, further comprising an image signal rearranging processor that rearranges said image signals read at said first and second timings in order, so that arranged image signals of the correct order are obtained.

9. A film scanner provided with an imaging device for performing a main-scan of a film on which an image is formed to scan said image and a scanning mechanism for moving the film in a sub-scan direction perpendicular to said main-scan direction with respect to said imaging device, said scanning mechanism being provided with a transport table for supporting said film and transporting said film in said sub-scan direction, a transport mechanism for moving said transport table in said sub-scan direction, and an image signal reading processor for reading an image signal of said film obtained by said imaging device in synchronization with movement of said transport table, said transport mechanism being provided with a stepper motor serving as a source of drive power and driven in steps, and said image signal reading processor being configured to read said image signal at one or both of a first timing where said stepper motor stops at a rotational angle position of a step and a second timing where said stepper motor stops at least at one rotational angle position within a step.

* * * * *